(12) United States Patent
Kim

(10) Patent No.: US 7,176,642 B2
(45) Date of Patent: Feb. 13, 2007

(54) CATHODE RAY TUBE DISPLAY APPARATUS

(75) Inventor: Tai-hung Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 64 days.

(21) Appl. No.: 10/932,016

(22) Filed: Sep. 2, 2004

(65) Prior Publication Data
US 2005/0062447 A1    Mar. 24, 2005

(30) Foreign Application Priority Data
Sep. 8, 2003    (KR) .................... 10-2003-0062687

(51) Int. Cl.
G09G 1/04    (2006.01)
(52) U.S. Cl. .................... 315/405; 315/85; 313/430
(58) Field of Classification Search ................ 313/429, 313/430, 432, 439, 431; 315/8, 85, 405, 315/408; 250/505.1
See application file for complete search history.

(56) References Cited

U.S. PATENT DOCUMENTS

| | | | | |
|---|---|---|---|---|
| 5,363,022 A | * | 11/1994 | Kitou et al. ................ | 315/408 |
| 5,841,234 A | * | 11/1998 | Jeong ........................... | 315/85 |
| 6,054,804 A | * | 4/2000 | Oshima et al. ............. | 313/430 |
| 6,249,006 B1 | * | 6/2001 | Sakiyama ................. | 250/505.1 |
| 6,501,364 B1 | | 12/2002 | Hui et al. | |

FOREIGN PATENT DOCUMENTS

| | | |
|---|---|---|
| JP | 3-23605 | 1/1991 |
| JP | P2002-25468 A | 1/2002 |
| JP | P2002-44567 A | 2/2002 |
| KR | 1991-9768 | 11/1991 |
| KR | 1999-40839 | 12/1999 |
| KR | 2000-15800 | 8/2000 |

OTHER PUBLICATIONS

Korean Reference No. 2000-15800 relates to a flyback transformer for preventing electromagnetic interface.
Korean Reference No. 1999-40839 relates to an electromagnetic reducing apparatus for display device.
Japanese Reference No. 3-23605 relates to an electro-magnetic shielding apparatus.
Japanese Reference No. 2002-25468 relates to an electro-magnetic reducing apparatus method for CRT.
Chinese Office Action (dated Jun. 9, 2006) issued with respect to Chinese Application No. 2004100738996, which corresponds to above-referenced application.

* cited by examiner

Primary Examiner—Tuyet Vo
Assistant Examiner—Jimmy Vu
(74) Attorney, Agent, or Firm—Staas & Halsey LLP

(57) ABSTRACT

A CRT electric field shield display apparatus with an FBT having a plurality of high voltage output terminals, includes an offset voltage generator generating an offset voltage to offset an electric field due to high voltages outputted from the plurality of high voltage output terminals; and an electric field shielding member disposed around the FBT and having a conductor to which the offset voltage is applied.

15 Claims, 3 Drawing Sheets

CATHODE RAY TUBE DISPLAY APPARATUS

CROSS-REFERENCE TO RELATED APPLICATION

This application claims the benefit of Korean Patent Application No. 2003-62687, filed Sep. 8, 2003 in the Korean Intellectual Property Office, the disclosure of which is incorporated herein by reference.

BACKGROUND OF THE INVENTION

1. Field of the Invention

The present invention relates to a cathode ray tube (CRT) display apparatus including an FBT (flyback transformer) having a plurality of high voltage output terminals, and more particularly, to a CRT display device including an electric field shielding member easily shielding an electric field from an FBT.

2. Description of the Related Art

Recently, harmful electromagnetic waves radiated by electronic appliances have become an issue. Thus, limits on the harmful electromagnetic waves are internationally standardized and the electronic appliances are produced meeting the standard. Particularly, in a display apparatus using a CRT, the electromagnetic waves are not only harmful to humans, but are also likely to distort a displayed picture such that the reliability of the display device is deteriorated.

For example, the MPR-II standard established in Sweden prescribes the limits on the harmful electromagnetic waves in ELF (Extremely low frequency) and VLF (Very Low Frequency) ranges, and regulates devices radiating the harmful electromagnetic waves such as a television, a monitor, etc. The limits prescribed by the MPR-II standard are shown in a following Table 1.

TABLE 1

|  | Frequency Band | Limit Standard (at a distance of 50 cm) |
| --- | --- | --- |
| Electric field | ELF (5 Hz~2 kHz) | 25 V/m and below |
|  | VLF (2 kHz~400 kHz) | 2.5 V/m and below |
| Magnetic field | ELF (5 Hz~2 kHz) | 2.50 mG and below |
|  | VLF (2 kHz~400 kHz) | 0.25 mG and below |

As shown in Table 1, the limit in the ELF range is relatively high. Thus, a device using general CRT is capable of meeting the limit in the ELF range.

However, in the case of the VLF range, the limit is relatively low. Thus, it is difficult for the general CRT (except a high quality CRT) to meet the limit in the VLF range.

Here, the magnetic field due to voltage applied to a deflection coil can be easily shielded by compensating the deflection coil attached to an electron gun of the CRT or by separately adding an offset coil to the deflection coil. However, it is not easy to shield the electric field due to high voltage outputted from the FBT, including voltage applied to an anode. Therefore, there have been proposed various methods to shield the electric field due to the FBT. As general methods, the electric field is shielded by separately mounting a filter to a front of the CRT or by specially coating the inside of the CRT. However, such methods involve problems that there are stumbling blocks to mass production and production cost is increased because of complicated processes, technological difficulties, etc.

SUMMARY OF THE INVENTION

Accordingly, it is an aspect of the present invention to provide a CRT display apparatus easily shielding an electric field from an FBT.

Additional aspects and advantages of the invention will be set forth in part in the description which follows and, in part, will be obvious from the description, or may be learned by practice of the invention.

According to an aspect of the present invention, a CRT display device with an FBT having a plurality of high voltage output terminals comprises an electric field shielding offset voltage generator generating an offset voltage to offset an electric field due to high voltages outputted from the plurality of high voltage output terminals of the FBT; and an electric field shielding member disposed to at least one side of the FBT or around the FBT and having a conductor to which the offset voltage is applied.

According to an aspect of the invention, the electric field shielding offset voltage has a pulse waveform opposite in polarity but same in frequency to that of at least one of voltage outputted from the FBT other than G1 terminal.

According to an aspect of the invention, the electric field shielding offset voltage generator includes a G1 terminal of the high voltage output terminals of the FBT.

According to an aspect of the invention, the electric field shielding member includes an insulator surrounding the conductor.

BRIEF DESCRIPTION OF THE DRAWINGS

These and other aspects and advantages of the present invention will become apparent and more readily appreciated from the following description of the embodiments, taken in conjunction with the accompany drawings of which.

DETAILED DESCRIPTION OF THE EMBODIMENTS

Figure 1:
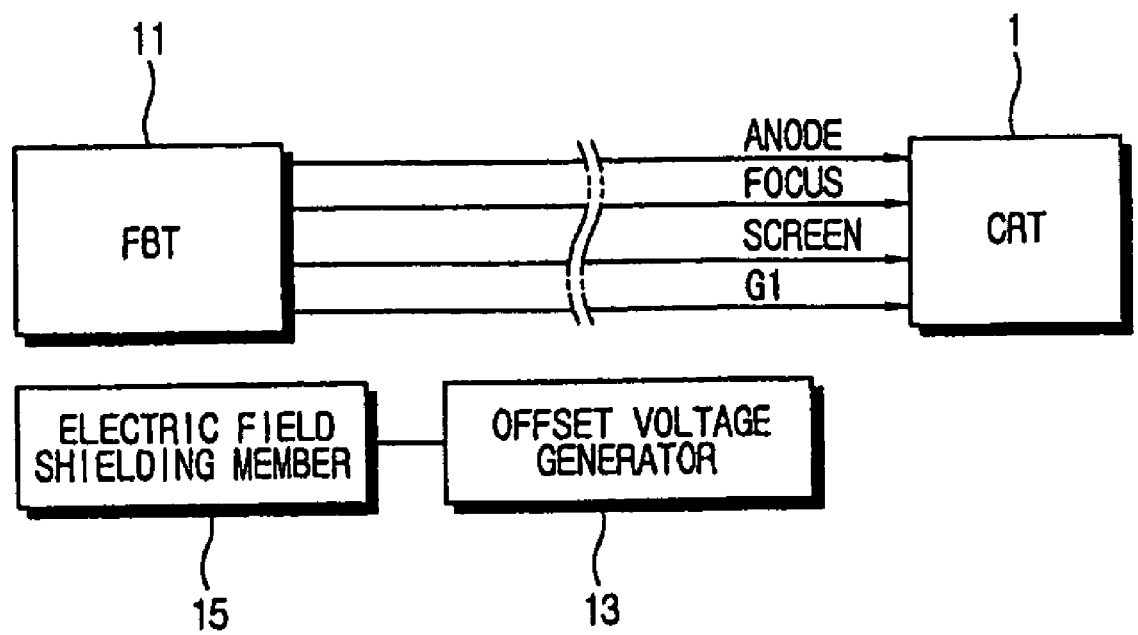
FIG. 1 is a block diagram schematically illustrating a CRT display apparatus having an electric field shielding member according to an aspect of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

FIG. 1 is a block diagram schematically illustrating a CRT display device having an electric field shielding member according to an aspect of the present invention. As shown therein, the CRT display device comprises a fly-back transformer (FBT) 11 having high voltage output terminals, an electric field shielding offset voltage generator 13 generating an offset voltage to offset an electric field due to high voltages outputted from the plurality of high voltage output terminals, and an electric field shielding member 15 disposed at least one side of the FBT 11 and offsetting the electric field due to the plurality of high voltages with the offset voltage applied thereto.

In the CRT display device, a cathode ray tube (CRT) 1 is employed in changing an electric signal into an optical signal. That is, an electron gun mounted to the CRT 1 emits electrons, and the electrons are led by positive electricity and travel through the tube, being deflected in directions of up, down, left and right by a deflection yoke. Then, the electron strikes a back of a screen coated with a phosphor to glow, so that an image such as a character, a figure, etc. is two-dimensionally displayed on the screen.

The FBT 11 is generally a pulse transformer, which supplies a high voltage required by an anode of the CRT 1 through a horizontal deflection circuit (not shown) after rectifying a pulse voltage generated by an LC resonance circuit of a horizontal output circuit provided in the CRT display device (e.g., a television or a monitor), using an HV (horizontal/vertical) coil. Alternately, the FBT 11 supplies the high voltage required for leading a beam of the electrons emitted from the electron gun to the screen through a horizontal circuit (not shown). At the same time, the FBT 11 supplies a voltage required by other circuits of the CRT 1 such as an AFC (auto frequency control) circuit, an AGC (auto gain control) circuit, a video circuit, and a focus circuit. That is, the FBT 11 converts the pulse voltage generated in its primary coil into a stable DC (direct current) high voltage.

The FBT 11 also supplies the stable DC high voltage to the anode of the CRT 1. Here, the anode voltage is generally 20 kV~30 kV DC.

Also, the FBT 11 divides a middle-high voltage in its middle terminal through focus resistors. The FBT 11 supplies the divided voltage to a focus terminal and a screen terminal of the CRT 1. Here, the focus voltage is generally 6 kV, and the screen voltage is generally 0.5 kV~1.5 kV.

Further, the FBT 11 supplies a DC high voltage to a G1 terminal of the CRT 1 so as to control a beam current of the electrons. Here, the FBT 11 outputs the high voltage being generally −160 Vpp and passes it through a rectifying diode and a smoothing capacitor, thereby supplying the DC high voltage to the G1 terminal of the CRT 1.

Additionally, the FBT 11 supplies a synchronous pulse (AFC voltage).

Thus, the FBT 11 supplies the high voltages required to display a picture on the CRT 1 through the plurality of high voltage output terminals provided therein. Further, the high voltage outputted from the FBT 11 may be passed through a specific circuit as necessary to meet voltage property required by the CRT 1.

The electric field shielding offset voltage generator 13 generates the electric field shielding offset voltage to offset the electric field due to the plurality of high voltages outputted from the FBT 11. Here, the high voltages outputted from the FBT 11 are generally approximately equal in a phase. Further, if the high voltages have a pulse, they are generally approximately equal in frequency. Therefore, the electric field due to such plurality of high voltages can be offset by generating another voltage different in only a polarity from the plurality of high voltages. Thus, the electric field is offset by generating a voltage equal in frequency but opposite in polarity to that of the plurality of high voltages outputted from the FBT 11. While shown as being separate, it is understood that the generator 13 can also use the voltage generated by the FBT 11 as shown in FIG. 2.

Figure 2:
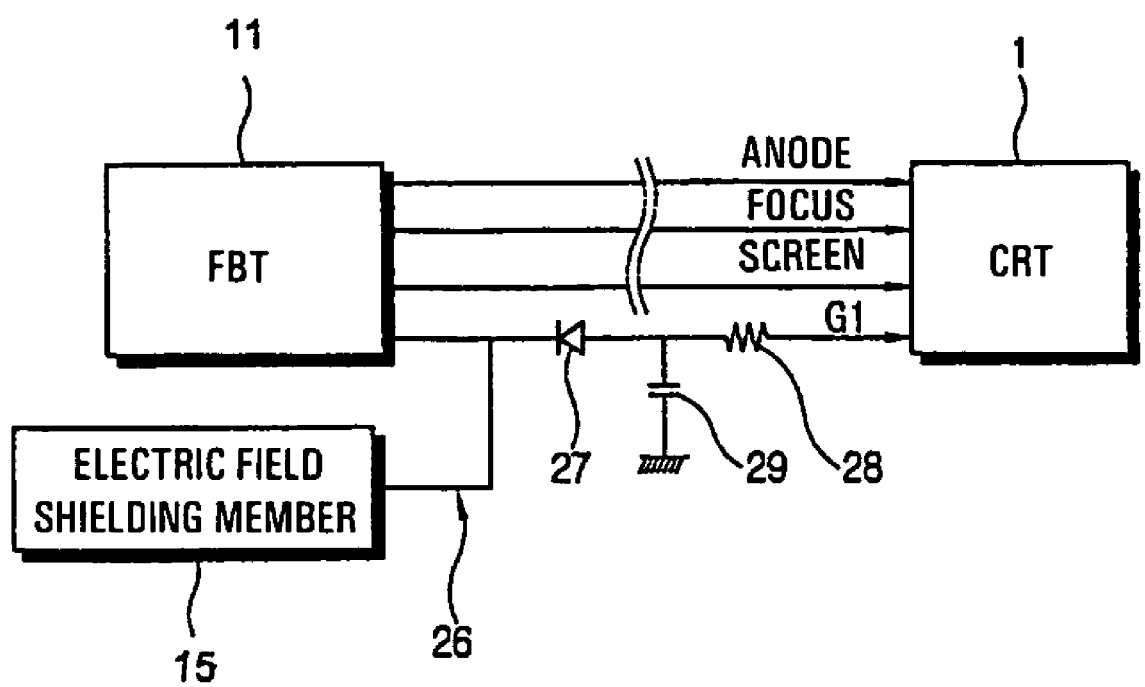
FIG. 2 is a block diagram schematically illustrating the CRT display device having an electric field shielding member according to an embodiment of the present invention.

Meanwhile, referring to the embodiment shown in FIG. 2, the high voltage required by the G1 terminal of the CRT 1 is supplied from an FBT 11 so as to control the beam current of the electrons. Here, the FBT 11 outputs the high voltage (generally −160 Vpp) and having a a polarity for a pulse waveform opposite to that of at least one of the high voltages outputted from the FBT 11. The output pulse is rectified by a rectifying diode 27 and smoothed by a smoothing capacitor 29. The rectified pulse thus supplies the voltage of −140V DC that is then supplied to the G1 terminal of the CRT 1 through a resistor 28.

At this time, the electric field shielding offset voltage generator 13 can employ the pulse voltage of −160 Vpp as the electric field shielding offset voltage, which is supplied to the G1 terminal to control the beam current of the electrons. That is, the voltage before being rectified by the rectifying diode 27 is employed as the offset voltage.

The electric field shielding member 15 will be described hereinbelow with reference to FIG. 3 in which the FBT 11 and the electric field shielding member 15 are illustrated as a perspective view. As shown therein, an electric field shielding member 15 includes a conductor 25a to which the offset voltage generated from the electric field shielding offset voltage generator 13 is applied, and is connected to the electric field shielding offset voltage generator 13 (refer to FIG. 1) by the a connecting wire 26.

For example, where the electric field shielding offset voltage generator 13 and the conductor 25a are connected by the connecting wire 26 on a PCB (printed circuit board), the electric field shielding member 15 may include a connector in a lower part thereof so as to connect with the connecting wire 26 printed on the PCB and connected to the offset voltage generator 13.

The conductor 25a is made of high conductive metal such as gold, silver, platinum, copper, etc., wherein the copper is a generally more economically appropriate metal for the conductor 25a. However it is understood that other materials can be used.

Further, the electric field shielding member 15 includes an insulator 25b surrounding the conductor 25a. The insulator 25b keeps the conductive metal to which the high voltage of 160 Vpp is applied from being exposed, thereby preventing a hazard due to negligence and carelessness of a user.

While not required, width of the electric field shield member 15 corresponds to the width of the FBT 11. Additionally, a height of the electric field member is longer then 120 mm. However, it is understood that other heights and widths can be used.

As an aspect of the invention, the electric field shielding member 15 is disposed around the FBT 11. In the shown embodiment. The electric field shielding member 15 is disposed at a right side of the FBT 11. However, it is understood that the electric field shielding member 15 may be disposed in any side of the FBT 11 or all around the FBT 11.

Figure 3:
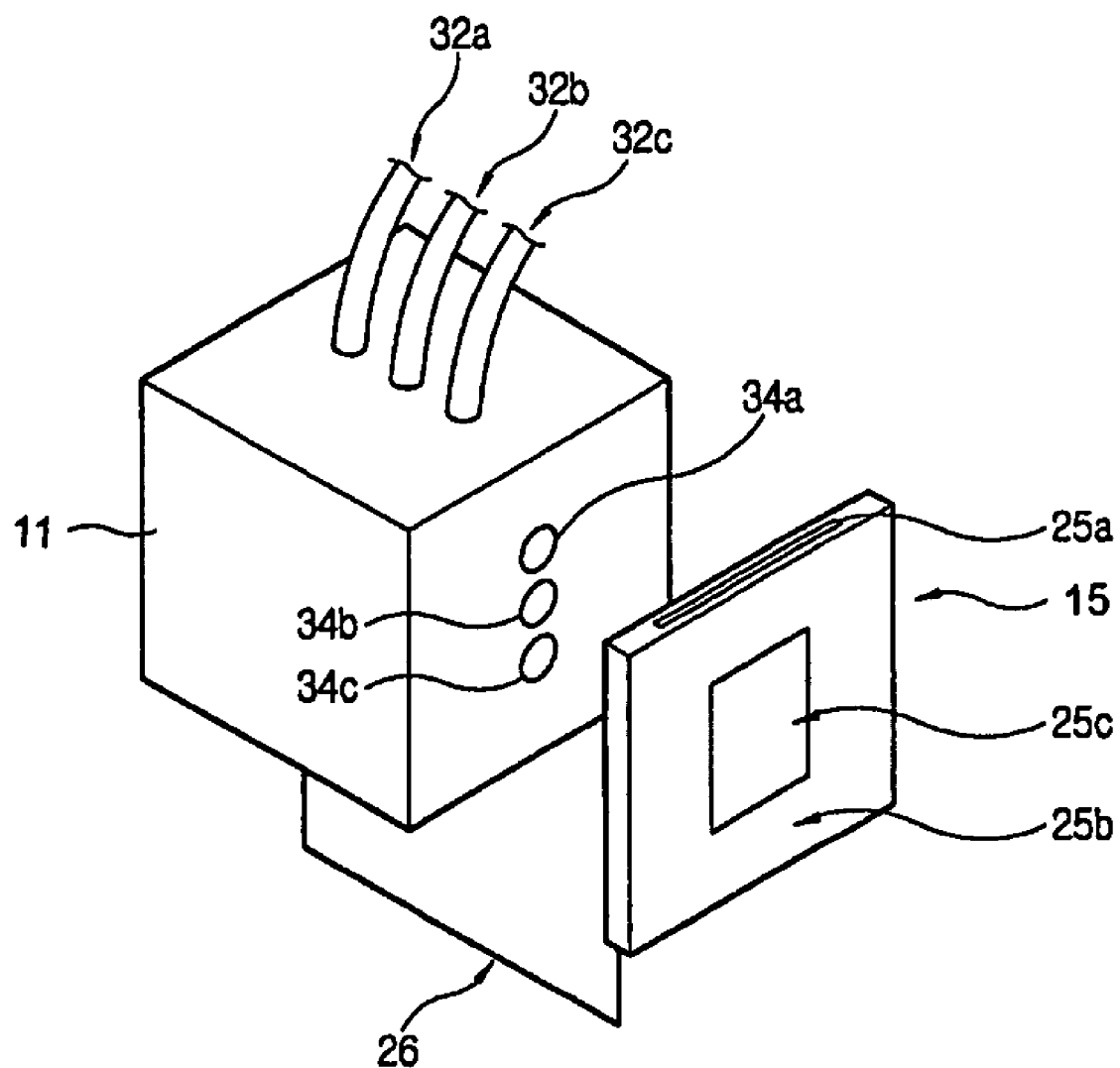
FIG. 3 is a perspective view of an FBT and the electric field shielding member of FIG. 2.

With reference to FIG. 1 and FIG. 3, V (vertical) and H (horizontal) focus wire 32a and 32b outputting the focus voltage, and a G2 wire 32c outputting an accelerating voltage of the electron gun are schematically illustrated in an upper surface of the FBT 11. Further, focus volume terminals 34a and 34b allowing a focus of the CRT 1 to be manually adjusted, and a G2 volume terminal 34c allowing the accelerating voltage of the electron gun to be manually adjusted are schematically illustrated in a right surface of the FBT 11. As shown therein, in the case where the electric field shielding member 15 is disposed at a side of the FBT 11 has a plate shape and faces the focus volume terminals 34a and 34b and the G2 volume terminal 34c, the electric field shielding member 15 is preferably formed with an opening 25c through which a user can adjust the terminals 34a, 34b and 34c.

Further, in this embodiment, the electric field shielding member 15 is shaped like a plate. However, it is understood that the shape is not limited thereto, and may be achieved by a wire surrounding the FBT 11.

With this configuration, the opposite in polarity pulse voltage, particularly, the voltage being applied to the G1 terminal is applied to the insulated electric field shielding member 15, thereby partially offsetting the electric field due to the FBT 11.

On the other hand, test results according to an embodiment of the present invention are shown in a following Table 2. This Table 2 is the result of measuring the electric field corresponding to positions in a conventional CRT monitor and a CRT monitor according to an aspect of the present invention. Here, 0° is a front side of the CRT monitor, 90° is a lateral side toward a power supply of the monitor, 270° means a lateral side toward the FBT of the CRT monitor, 180° is a back side of the CRT monitor. Further, all measurements were performed at a distance of 50 cm from the CRT monitor.

TABLE 2

|  | Frequency Band | Limit Standard (V/m) | Position (angle) | Conventional Monitor | Present Monitor |
|---|---|---|---|---|---|
| Electric field | ELF | 25 | 0° | 8.7 | 7.66 |
|  | VLF | 2.5 | 0° | 1.472 | 0.998 |
|  |  |  | 90° | 1.725 | 1.330 |
|  |  |  | 180° | 2.64 | 1.546 |
|  |  |  | 270° | 2.31 | 0.396 |

According to the results as shown in Table 2, the electric field due to the CRT is shielded by shielding the electric field due to the FBT. Here, the shielded electric field due to the CRT is weak enough to meet the limits of the MPR-II standard, particularly, enough to meet the limits in the VLF range. Thus, the electric field due to the FBT 11 is shielded.

While described in terms of a FBT for use with a CRT, it is understood that the present invention can be used in any display devise having a transformer and/or in any device having a transformer in which the effects of the generated field are to be reduced.

As described above, an aspect of the present invention provides a CRT display device in which a pulse voltage, particularly, a voltage being applied to a G1 terminal is applied to an insulated electric field shielding member and shields an electric field due to an FBT, so that the electric field can be shielded enough to meet a predetermined range.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A cathode ray tube (CRT) display apparatus with a flyback transformer having a plurality of high voltage output terminals, comprising:
    an electric field shielding offset voltage generator generating an electric field shielding offset voltage to at least partially offset an electric field due to high voltages outputted from the plurality of high voltage output terminals; and
    an electric field shielding member disposed around the flyback transformer and having a conductor to which the offset voltage is applied;
    wherein the electric field shielding offset voltage comprises a pulse waveform having to a polarity opposite to a polarity of the high voltages outputted from the plurality of high voltage output terminals.

2. The CRT display apparatus according to claim 1, wherein one of the plurality of output terminals comprises a G1 terminal, and the offset voltage generator comprises a connection to the G1 terminal.

3. The CRT display apparatus according to claim 1, wherein the electric field shielding member further comprises an insulator surrounding the conductor.

4. The CRT display apparatus according to claim 1, wherein the electric field shielding member further comprises an insulator surrounding the conductor.

5. The CRT display apparatus according to claim 2, wherein the electric field shielding member further comprises an insulator surrounding the conductor.

6. A display apparatus comprising:
    a cathode ray tube (CRT);
    a vertical deflection coil and a horizontal deflection coil;
    a flyback transformer generating a voltage to supply the CRT, the vertical deflection coil, and the horizontal deflection coil;
    an electric field shielding member to shield an electric field generated from the flyback transformer; and
    an electric field shielding offset voltage generator generating an electric field shielding offset voltage to be applied to the electric field shielding member for eliminating the electric field;
    wherein the offset voltage is the same voltage and is equal in frequency but opposite in polarity to the voltage supplied to the CRT other than G1 terminal.

7. The display apparatus according to claim 6, a display apparatus wherein said electric field shielding member is disposed to at least one side of the flyback transformer.

8. An electric field shielding method for a display apparatus having a cathode ray tube (CRT), a flyback transformer, an electric field shielding member, and an electric field shielding offset voltage generator, the method comprising:
    applying a voltage to the CRT from the flyback transformer; and
    generating an electric field shielding offset voltage from the electric field shielding offset voltage generator;
    applying the electric field shielding offset voltage to the electric field shielding member having a same frequency as but opposite polarity to the voltage applied to the CRT;
    wherein the electronic field shielding offset voltage comprises a pulse waveform having to a polarity opposite to a polarity of the high voltages output from a plurality of high voltage output terminals.

9. The method according to claim 8, wherein the electric field shielding member further comprises an insulator surrounding the conductor.

10. The method according to claim 8, the electric field shielding member further comprises at least an opening thereon to access to a volume.

11. A display apparatus having a flyback transformer with at least one terminal, a cathode ray tube, and an electric field shielding member, wherein:
    the flyback transformer supplies a voltage through the one terminal to a G1 terminal of the cathode ray tube to control a beam of current of the electrons; and the electric field shielding member is connected with the flyback transformer at the one terminal which is connected with the G1 terminal and is supplied an electric field shielding voltage; and an electric field shielding offset voltage generator generating an electronic field shielding offset voltage to at least partially offset an electric field due to high voltages output from the plurality of high voltage output terminals;

wherein the electric field shielding offset voltage comprises a pulse waveform having to a polarity opposite to a polarity of the high voltages outputted from a plurality of high voltage output terminals.

12. The display apparatus in a claim 11, wherein the electric field shielding member further comprises a conductor.

13. The display apparatus in a claim 12, wherein the electric field shielding member further comprises an insulator surrounding the conductor.

14. The display apparatus in a claim 11, wherein the electric field shielding offset voltage is about −160 Vpp.

15. The CRT display apparatus according to claim 1, wherein the electric field shielding offset voltage is about −160 Vpp.

* * * * *